Patented Aug. 22, 1944

2,356,408

UNITED STATES PATENT OFFICE 2,356,408

HARD WAX SUBSTITUTE

Maurice J. Kelley, Philadelphia, Pa., assignor to National Oil Products Company, Harrison, N. J., a corporation of New Jersey No Drawing. Application June 17, 1941, Serial No. 398,410

2 Claims. (Cl. 106—287)

This invention relates in general to synthetic waxes and in particular to synthetic substitutes for the hard vegetable waxes, such as carnauba, candelilla and the like.

The hard vegetable waxes consist largely of esters of long-chain saturated fatty acids and alcohols and heretofore substitutes for these waxes have been sought in synthetic products as nearly as possible duplicating this chemical structure; that is to say, wax-like esters have been prepared from commercially available fatty acids and alcohols. Such products must necessarily fall short of parity with the natural waxes, as only fatty alcohols and acids having relatively short chains of at the most 18 or so carbon atoms will offer any price advantage over the vegetable waxes, the constituents of which have relatively long chains of from 28 to 30 carbon atoms; and the synthetic product will accordingly lack the hardness, toughness, high melting point and polish characteristics of the hard vegetable waxes.

Substitutes for the hard vegetable waxes have also been sought in blends of various materials, such as higher alcohols, fatty acids, paraffin waxes, and the like. However, such products, being mixtures, lack the sharp melting point, toughness, lustre, stability and non-selective solubility and compatibility of the hard vegetable waxes.

Accordingly it is an object of this invention to provide a wax substitute, the fatty constituents of which may be derived from the cheaper commercial materials, but which will nevertheless possess the hardness, high melting point, toughness and lustre characteristic of the vegetable waxes.

A further object is to provide a wax substitute which will be constituted substantially of a single compound or of a few very closely similar compounds, and which accordingly will possess the sharp melting point, toughness, lustre, stability and non-selective solubility and compatibility of the hard vegetable waxes.

A still further object is to provide a wax-substitute, the constituent molecules of which present the same general steric aspect as do the hard vegetable waxes, so as to possess similar physical and colloidal properties and to be compatible therewith.

A still further object is to provide a wax substitute which will be chemically stable against hydrolysis by weak acids and alkalies.

The above and other objects are secured by this invention in substances containing a class of compounds which may be regarded as ammonia analogoues of the hard vegetable ester waxes, i. e. the compounds disclosed herein are amides of fatty acids with fatty amines, and particularly of hydroxylated saturated fatty acids with alkylolamines and esterified alkylolamines. Such amido compounds may be represented, in parallel with corresponding ester waxes, as follows:

Synthetic wax of the present invention:

Typical hard vegetable wax:

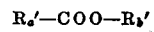

wherein:

$n$ is a small whole number;

$R_a$ is any relatively short chain saturated fatty residue and may contain upwards of 11 carbon atoms;

$NHR_bO$ is a residue of an alkylolamine containing upwards of 2 carbon atoms;

The bracket indicates alternate substitution of the substituents shown embraced thereby;

$R_c$ is an organic group, and $R_a'$ and $R_b'$ are the relatively long-chain (28–30 carbon atoms) saturated fatty residues occurring in hard vegetable waxes.

From a comparison of the above formula, it will be apparent that the two classes of compounds present the same general steric aspect, so as in general to have like physical and colloidal properties and to be mutually compatible; however, in the case of the synthetic amide compound, it is discovered by this invention that the substitution of the amido- for the carboxy linkage, and the addition of hydroxyl and/or ester groups in the two chains $R_a$ and $R_b$, exert a hardening effect, so that even with the relatively short chains $R_a$ and $R_b$, derivable from cheap raw materials, it is nevertheless possible to secure a hardness and high melting point found in the ester waxes only when the chains $R_b'$ and $R_c'$ are considerably longer, and hence not commercially obtainable elsewhere than from the hard natural waxes themselves. As a specific example, one waxy amino compound of this invention which may be represented as follows:

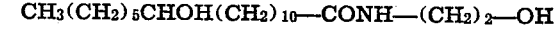

has a melting point of about 93° C. A corresponding vegetable wax having much longer fatty chains:

would having a melting point of about 83° C. As will appear from the specific examples to follow, the short fatty chains in the waxy amino compound are derivable from relatively cheap materials.

Referring to the general formula on page 1 herein, the acidic portion of the compound to the left of the NH group may be derived from any hydroxylated saturated fatty acid, glyceride, acid anhydride or acyl chloride, as for instance, hydrogenated castor oil, hydrogenated castor oil fatty acids, dihydroxy stearic acid, and their amide-forming derivatives; and the amide portion of the compound to the right of the CO group may be derived from the various alkylolamines, such as, for example, monoethanolamine, diethanolamine, ethanol ethyl amine, ethanol butyl amine, and ethanol ethylene diamine. The acidic portion of the ester group, $COR_c$, may be supplied as any saturated fatty acid, saturated fatty glyceride, fat containing saturated fatty glycerides, saturated fatty acyl chloride or saturated fatty acid anhydride, such as stearic, lauric and hydroxystearic acids; tallow, hydrogenated castor oil, hydrogenated cottonseed oil; and the acyl chlorides and anhydrides corresponding to these materials. Conveniently, this esterifying acid component may be furnished by an excess of the material used to furnish the acidic portion of the compound to the left of the NH group. The condensation of pairs of these materials may readily be brought about by reacting them together at temperatures from 125° to 250° C. for from 2 to 20 hours, preferably at 150° to 175° C. for from 4 to 8 hours, at which time the reactions will be about 95% complete. Catalysts, inert atmospheres, pressure or vacuum can be used, but are not ordinarily required.

To the wax-like products obtained as above out-lined may be added glycerine, hydroxylated saturated fatty acids or partial glyceryl esters of such acids, which serve to plasticize the products and to improve their stability by increasing the solubility of the unreacted ingredients and by-products of the reaction; or these plasticizing and solubilizing agents may be produced incidentally during the condensation process. For instance, when glycerides are used to supply the acidic constituent, glycerine and partial glycerides will be liberated, which may advantageously be allowed to remain in the product as plasticizers, appearing for some reason to be superior for this purpose to compounds mixed into a condensation product in which glycerine was not liberated during formation.

Following are specific examples illustrating the above general principles and discussion. Amounts are given in parts by weight.

*Example I*

84 parts (1 equivalent) of hydrogenated castor oil having an iodine number of 11 or less, and 16 parts (1 equivalent) of mono-ethanolamine were mixed and the mixture agitated at temperatures ranging from 150° to 175° C. for 6 hours. The product, principally the mono-ethanolamide of hydroxy stearic acid, together with the unreacted material, the by-products and the glycerine (about 8%) resulting from the amidification was a hard, waxy solid melting at 90.5° C., soluble in alcohol, glycerine, Stoddard solvent, turpentine, oleic acid, beeswax, carnauba wax and candelilla wax. The product was not directly dispersible in water, but aqueous dispersions were made from the alcohol and Stoddard solvent solutions.

*Example II*

82 parts (1 equivalent) of hydrogenated castor oil fatty acids having an iodine number of less than 11 and 18 parts (1 equivalent) of mono-ethanolamine were mixed, and the mixture heated at temperatures ranging from 150° C. to 175° C. for 5 hours. The product, consisting principally of the mono-ethanolamide of hydroxy stearic acid (without any glycerine as in Example I supra), was a hard, waxy solid melting at 93° C., and suitable in general for use as a wax substitute.

*Example III*

90 parts (1 equivalent) of hydrogenated castor oil fatty acids and 10 parts (½ equivalent) of mono-ethanolamine were mixed, and the mixture agitated at temperatures ranging from 150° C. to 175° C. The product, consisting principally of an esterified alkylolamide of hydroxystearic acid, $$CH_3(CH_2)_5CHOH(CH_2)_{10}CONH(CH_2)_2$$
$$OOC(CH_2)_{10}CHOH(CH_2)_5CH_3$$

was a hard, waxy solid melting at 78° C. and soluble in alcohol, glycerine, Stoddard solvent, turpentine, oleic acid, beeswax, candelilla wax and carnauba wax.

*Example IV*

90 parts of the wax-like product obtained as described in Example I supra were mixed with 10 parts of the monoglyceride of hydrogenated castor oil fatty acids. The resulting product was a waxy solid melting at 92° C.

*Example V*

95 parts of the wax-like product obtained as described in Example III supra were mixed with 5 parts of glycerine. The plasticity of the wax was thereby enhanced and the melting point lowered to 88° C.

The compositions prepared as above described are all wax-like substances of light color having melting points, hardness and gloss equal to ester waxes of very much higher molecular weight, although they can be prepared from the relatively cheaper and more readily obtainable short chain fatty materials. The structures of their constituent chemical compounds are further quite similar to the true waxes in general steric aspect, which similarity is reflected in their hardness, high melting point, ductility and gloss, and in their compatibility with wax and the solvents for wax. They consist of relatively pure compounds, which simplifies the problems arising in the use of the material in various compositions. They are, further, more stable than ester waxes due to the superior resistance to hydrolysis of the amido-linkage over the ester linkage. These products have been found, on account of their high, sharp melting point, hardness, ductility, adhesiveness and compatibility, to be excellent vehicles for the ink in the Huber "cold set" printing process (see "The Velo cold set process" by F. G. Breyer, Paper Trade Journal, June 13, 1940, page 27, for a description of this process), for which application they have largely supplanted carnauba wax. They have also been found suitable for plastic mold lubricants; crayon binder compositions; carbon-paper coatings; waxes and polishes for wood-work, leather, fruit, etc.; oiling and waxing cordage, twine and threads; waxing paper twine; and in general should find application wherever the hard vegetable waxes are employed.

Since certain changes may be made in the above products and different embodiments could be made without departing from the scope thereof, it is intended that all matter contained in the above description shall be interpreted as illustrative and not in a limiting sense.

Having described my invention, what I claim as new and desire to secure by Letters Patent, is:

1. Hard wax substitutes containing major portions of alkylolamides of the fatty acid radicals occurring in hydrogenated castor oil having an iodine number of 11 or less and consisting principally of the alkylolamides of hydroxy stearic acid, together with minor portions of glycerine.

2. Hard wax substitutes containing major portions of ethanolamides of the fatty acid radicals occurring in hydrogenated castor oil having an iodine number of 11 or less and consisting principally of the ethanolamides of hydroxy stearic acid, together with minor portions of glycerine.

MAURICE J. KELLEY.